United States Patent Office 2,711,373
Patented June 21, 1955

2,711,373

PREPARATION OF MEAT PRODUCTS

Harold M. Coleman, Chicago, and Ervin W. Hopkins, Hinsdale, Ill., assignors to Armour and Company, Chicago, Ill., a corporation of Illinois No Drawing. Application January 23, 1951,
Serial No. 207,432

7 Claims. (Cl. 99—107)

This invention relates to the preparation of meat products. More particularly it relates to a process for treating comminuted meat whereby the retention of red color both on the exterior surface and on the interior of the meat mass is greatly improved.

Meat is known to contain a number of oxygen-bearing pigments including myoglobin and hemoglobin which are compounds of ferroheme and protein. Myoglobin is purplish-red in color and when it takes up oxygen it becomes oxymyoglobin which is bright red. Oxidation of oxymyoglobin produces metmyoglobin which is grayish-brown in color. Similarly, hemoglobin is purplish-red and on oxygenation becomes oxyhemoglobin which is bright red and this when oxidized to methemoglobin is grayish-brown. These changes in meat color begin to occur immediately on exposure to air and in a short time the meat surface exhibits a brownish tinge showing that the color change from purplish red to bright red to grayish-brown has been completed. While such color change is in no way indicative of wholesomeness or palatability of the meat, the brown color greatly detracts from the general appearance and attractiveness of the meat.

The color changes due to the presence of these meat pigments are readily apparent in the case of ground meat. When beef is ground into hamburger, for example, the exterior of the meat is subjected to contact with the oxygen of the air which converts the myoglobin of the exterior surface portion to oxymyoglobin, which is bright red in color. The interior of the hamburger body assumes a purplish-red color due to the reduced state of the myoglobin. Even if the entire meat mass were converted to the bright red oxymyoglobin pigment through contact with the air in the grinding operation, the natural enzymes and reducing compounds of the meat quickly convert the oxymyoglobin into its reduced state, myoglobin. The resulting meat mass is unsatisfactory in that it has meat portions of different colors and is unattractive because of the purplish-red color of the interior. On storing, this contrast is intensified as the oxy-pigments of the surface are further oxidized to the grayish-brown methemoglobin and metmyoglobin.

Various methods have been suggested to improve the color stability of meat; for example, it has been proposed that ascorbic acid be dusted on a meat surface to prolong the retention of the red exterior color. In our United States Patent Number 2,521,579, we disclosed a process in which frozen ground meat particles are pressed together to entrap minute quantities of air in the interstices of the comminuted meat mass. This treatment produces a meat product having improved interior color which is retained for periods of from one to two days.

We have now discovered a new process which eliminates the freezing and pressing-while-frozen steps essential to the practice of the process of our Patent Number 2,521,579 and which new process produces a product combining both the improved surface color of ascorbic acid treatment and the bright red interior color of our prior process. In addition, our new treatment results in the retention of the desired color for much longer periods of time than has been possible using the process as heretofore known.

Our new process involves the prolonged exposure of thin layers of comminuted meat to an atmosphere of oxygen. We have discovered that the time of exposure required to produce the improved meat product is at least eighteen hours and that by increasing the time of exposure to about three days even greater color stability is obtained. In addition, we have found that the improved color characteristics result only when the exposure is to an atmosphere containing at least fifty per cent oxygen.

Our new process is dependent on both the percentage of oxygen present in the atmosphere and on the length of time the meat is exposed. If the oxygen is reduced below fifty per cent the time of exposure required is so long that the process becomes impracticable. For example, if an atmosphere of air which contains approximately 21% oxygen is employed in our process, the times of reaction by oxygen and of exposure required for penetration of sufficient quantities of the oxygen is so extended that bacterial action takes place and the meat spoils before the improved color characteristics are produced. Therefore, it will be understood that when we speak of an atmosphere of oxygen we do not include air but require that fifty per cent or more oxygen be present.

In a preferred practice of our invention we comminute the meat by any convenient method and distribute the comminuted meat in thin layers for exposure to oxygen. The exposure to oxygen is performed in any suitable chamber having means for introducing the oxygen and capable of being sealed to exclude the outside air so as to maintain the oxygen atmosphere intact.

The meat may be arranged in a convenient manner which provides adequate oxygen penetration. We prefer to spread the comminuted meat in thin layers on perforated screen shelves which we arrange in tier-like fashion within the oxygen chamber.

We prefer to grind the meat into strands having a small cross-sectional area as, for example, by passing the meat through a plate having 1/8" holes. When meat strands of such size are spread in thin layers the oxygen rapidly diffuses throughout the meat and saturates the meat tissue. In these specifications and the appended claims we use the expression "saturating with oxygen" to include the penetration by diffusion of oxygen throughout the interior of the meat strands as well as the intimate contact of the oxygen atmosphere with the exposed exterior meat surface. We find that meat tissue which has been thus saturated with oxygen exhibits superior exterior and interior color and that this improved color is maintained for longer periods than meat treated by processes heretofore employed.

While our invention is not limited to any theory of explanation, we believe the characteristic retention of bright red color in meat treated by our process may be due to the inactivation of the reducing system present in the meat. Animal tissues are known to contain several dehydrogenases, such as succinic acid and malic acid dehydrogenase which permits the reduction of oxygen by catalyzing the removal of hydrogen from succinic and malic acids respectively. By such action the oxy-pigments of the interior of the meat are converted to the purple-red hemoglobin and myoglobin. In addition to this undesirable interior color change, the action of the reducing substances in removing oxygen produces a condition of lowered oxygen pressure in the region just below the surface of the meat where some degree of penetration of oxygen from the outside air occurs. The low oxygen pressure induced in this region is known to accelerate the formation of the brown met-pigments which, as a background for the surface, cause such surface to appear unattractively brown.

It is our belief that by our process, the action of the reducing substances is prevented and the red oxy-pigments of the interior are permitted to remain intact. In addition, the elimination of the action of these reducing substances avoids the creation of areas of lower oxygen pressure just beneath the surface of the meat thereby greatly reducing the rapidity with which the brown met-pigments are formed in these areas.

We have found that when comminuted meat is exposed to oxygen for a period of from 18 to 24 hours apparently some dehydrogenase activity remains. When loaves formed after such exposure are stored at temperatures above freezing, the bright red exterior and interior color is maintained for about 4 hours. On further storage at this temperature the slow removal of oxygen throughout the meat produces a condition of lowered oxygen concentration which favors accelerated oxidation to the met-pigments, and produces brown areas throughout the interior of the loaves.

While the 18 to 24 hour period of oxygen exposure is apparently insufficient to completely prevent dehydrogenase activity, we have found that the initial red color can be maintained if the meat is frozen within 4 hours following the oxygen exposure. Loaves which had received this treatment were held in frozen storage and observed for interior and exterior color. Under these conditions any residual enzyme activity is dormant and since no significant removal of oxygen could therefore occur, both the interior and exterior colors remained bright red after 8 days.

When comminuted meat is exposed to an atmosphere of oxygen for a period of three days, we have found that the dehydrogenase activity apparently is effectively rendered inactive. Loaves formed from meat which had been so exposed when stored for 4 days retained bright red colors both on the interior and on the surface of the loaves.

While the extended period of one day exposure to an atmosphere of oxygen is effective in retaining bright red color when the meat is subsequently frozen and stored, we have found that where it is desired to subsequently defrost the loaves the even longer period of 3 days' exposure is still more effective. For example, meat exposed to oxygen for 3 days was formed in loaves, frozen and stored for 7 days. These loaves were then defrosted and after 4 days were found to have the desirable red colors both within the interior and upon the exterior.

While we have set forth the details of a prolonged period of exposure of one day and of a still longer period of three days, it will be understood that these periods are not inflexible but that the duration of such exposure may be varied and still be within the scope of our invention. To secure the benefit of our process it is necessary merely that the duration of exposure be sufficient to allow diffusion and reaction of the oxygen throughout the meat and we have found an exposure of 18 hours to be the minimum practicable limit for this purpose.

If the oxygen atmosphere is maintained under pressure, the rate of diffusion of the gas into the meat particles will tend to increase and the time of exposure may be somewhat shortened. If the exposure is for a shorter period than 24 hours, however, the residual enzyme activity will be of greater magnitude and it may therefore be necessary to carry out the freezing step sooner than 4 hours after such exposure in order to retain the improved meat color in the frozen loaf. While meat may be exposed to the oxygen atmosphere for periods exceeding 3 days, such additional exposure is not necessary. The 3 day exposure provides meat which retains the desirable bright red color after 4 days of unfrozen storage and this length of time is adequate to insure that the desired color is retained until the meat has been purchased and consumed.

We prefer to employ commercial grade oxygen gas, which comprises substantially 95% pure oxygen, in our process. It will be understood that the composition of the atmosphere to which the meat is exposed may be varied but that the time of exposure necessary to achieve comparable results will be lengthened as the percentage of oxygen in the atmosphere is decreased.

Our process is applicable to any meat tissue containing oxygen-bearing pigments including hemoglobin and myoglobin and may be used to improve the color retention qualities of beef, pork, veal, lamb, mutton, etc.

Following are specific examples of the practice of our invention:

*Example 1*

Fresh beef trimmings were ground through a 1½ inch plate and added to kidney fat which had been ground through a ⅜ inch plate. The mixture was then ground through a ⅛ inch plate and the resulting stranded meat spread on coarse screen trays which were arranged in tiers in a sealed chamber in which an atmosphere of 95% oxygen was maintained. After such exposure for 24 hours, the meat was formed into loaves which were frozen at −50° F. and then stored at 0° F. Following 8 days storage, both the interior and exterior of the loaves were bright red in color.

*Example 2*

Comminuted meat prepared as described in Example 1 was exposed to an atmosphere of oxygen for 3 days and then formed into loaves. The loaves were stored at 38° to 40° F. and after 4 days were broken open. Both the interior and exterior surface of the loaves had retained the attractive bright red color.

*Example 3*

Meat of the composition described in Example 1 was maintained in an atmosphere of oxygen for a period of 3 days. Following such exposure, the meat was formed into loaves which were frozen at −50° F. and stored at 0° F. for 8 days. The loaves were then defrosted and held at 38° to 40° F. for 4 days. The surfaces and interiors of these loaves possessed a desirable bright red color.

Loaves prepared from pork, veal and lamb after being exposed to an atmosphere of oxygen in accordance with our process all show greatly improved retention of attractive color when stored at 38° to 40° F. Moreover, the removal of oxygen, if any, is so slow at lower temperatures that under suitable conditions of frozen storage, the meat may be held indefinitely and on defrosting, the bright red color still remains after 4 days.

While in the foregoing specification we have set forth certain details and specific steps, it will be understood that variations therein may be made by those skilled in the art without departing from the spirit of our invention.

We claim:

1. In a process for promoting the retention of red color in meat, the steps of comminuting the meat, forming the comminuted meat in thin layers, and subjecting the meat while in said thin layers to contact with an atmosphere of at least 50% oxygen for a period of at least 18 hours.

2. In a process for promoting the retention of red color in a meat mass, the steps of comminuting the meat, forming the comminuted meat in thin layers, exposing the meat while in said thin layers to an atmosphere of at least 50% oxygen for about 24 hours, pressing the treated meat together in a predetermined form, and then freezing the meat mass formed.

3. In a process for promoting the retention of red color in a meat mass, the steps of comminuting the meat, spreading the comminuted meat in thin layers, exposing the meat while in said thin layers to an atmosphere of at least 50% oxygen for a period of about 3 days and pressing the treated meat together in a predetermined form.

4. In a process for promoting the retention of red color in meat, the steps of comminuting the meat, spreading the comminuted meat in thin layers, exposing the meat while in said thin layers to an atmosphere of at least 50% oxygen for a period of about 3 days, pressing the treated meat together in a predetermined form, and freezing the meat mass so formed.

5. In a process for improving color retention characteristics in meat, the step of subjecting thin layers of comminuted meat to exposure to an atmosphere of at least 50% oxygen for a period of at least 18 hours.

6. In a process for improving the color stability of meat, the steps of comminuting the meat, spreading the comminuted meat in thin layers, exposing the meat while in said thin layers to an atmosphere of substantially pure oxygen for about 24 hours, and freezing the oxygen-exposed meat within 4 hours following said exposure.

7. In a process for promoting the retention of red color in meat, the steps of comminuting the meat, forming the comminuted meat into thin layers and exposing the meat while in said thin layers to an atmosphere of at least 50 per cent oxygen for a period of at least 18 hours to completely inactivate the enzyme reducing system present therein.

References Cited in the file of this patent

UNITED STATES PATENTS

| | | |
|---|---|---|
| 2,521,579 | Hopkins et al. | Sept. 5, 1950 |
| 2,521,849 | Hopkins et al. | Sept. 12, 1950 |